(12) United States Patent
Yada et al.

(10) Patent No.: US 7,669,797 B2
(45) Date of Patent: Mar. 2, 2010

(54) BOARDING RAMP DEVICE FOR AIRCRAFT

(75) Inventors: Wataru Yada, Saitama (JP); Hiroshi Yamanouchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 231 days.

(21) Appl. No.: 11/730,732

(22) Filed: Apr. 3, 2007

(65) Prior Publication Data
US 2007/0283512 A1      Dec. 13, 2007

(30) Foreign Application Priority Data
Apr. 4, 2006    (JP) .............................. 2006-103268

(51) Int. Cl.
*B64C 1/14*    (2006.01)
(52) U.S. Cl. .............. 244/118.3; 244/129.5; 244/137.2; 192/69.7; 192/69.82; 192/89.21; 192/89.27
(58) Field of Classification Search ............. 244/118.3, 244/129.5, 129.6, 137.2; 192/69.7, 69.82, 192/89.21, 89.27
See application file for complete search history.

(56) References Cited

U.S. PATENT DOCUMENTS

| | | | | |
|---|---|---|---|---|
| 1,386,054 A | * | 8/1921 | Fowler | 192/27 |
| 2,531,263 A | * | 11/1950 | Fink et al. | 182/97 |
| 2,808,257 A | * | 10/1957 | Brookbank | 49/109 |
| 3,416,757 A | * | 12/1968 | Maraghe | 244/129.5 |
| 4,014,486 A | * | 3/1977 | Nelson et al. | 244/129.6 |
| 4,086,726 A | * | 5/1978 | Moses | 49/37 |
| 4,276,944 A | * | 7/1981 | Geczy | 175/101 |
| 4,440,364 A | * | 4/1984 | Cone et al. | 244/129.6 |
| 4,453,684 A | * | 6/1984 | Hanks | 244/129.5 |
| 5,542,626 A | * | 8/1996 | Beuck et al. | 244/107 |
| 5,577,793 A | * | 11/1996 | Kobasic | 296/146.4 |
| 5,752,373 A | * | 5/1998 | Cappo et al. | 56/11.3 |
| 2008/0099605 A1 | * | 5/2008 | Yada et al. | 244/118.3 |

FOREIGN PATENT DOCUMENTS

JP        4-230495 A    8/1992

* cited by examiner

*Primary Examiner*—Timothy D Collins
*Assistant Examiner*—Justin Benedik
(74) *Attorney, Agent, or Firm*—Birch, Stewart, Kolasch & Birch, LLP

(57) ABSTRACT

A foldable boarding ramp is operatively connected to a door opening provided in a body and is selectively extendable to the ground. The foldable boarding ramp is stored in a folded state inside a fairing covering a connecting portion between the body and a main wing. Thus, a reduction in the space of a passenger compartment and a cargo compartment due to the storage of the folded boarding ramp is prevented. In addition, an increase in air resistance can be suppressed without providing a dedicated fairing for covering the boarding ramp. Further, an interlocking member connects together a door for opening and closing the door opening and the boarding ramp when the door is opened. The boarding ramp may be automatically deployed to improve convenience.

5 Claims, 11 Drawing Sheets

DOOR FULLY OPENED STATE

DOOR FULLY CLOSED STATE

DOOR FULLY OPENED STATE (CLUTCH ENGAGED STATE)

FIG.9 (CLUTCH NON-ENGAGED STATE)

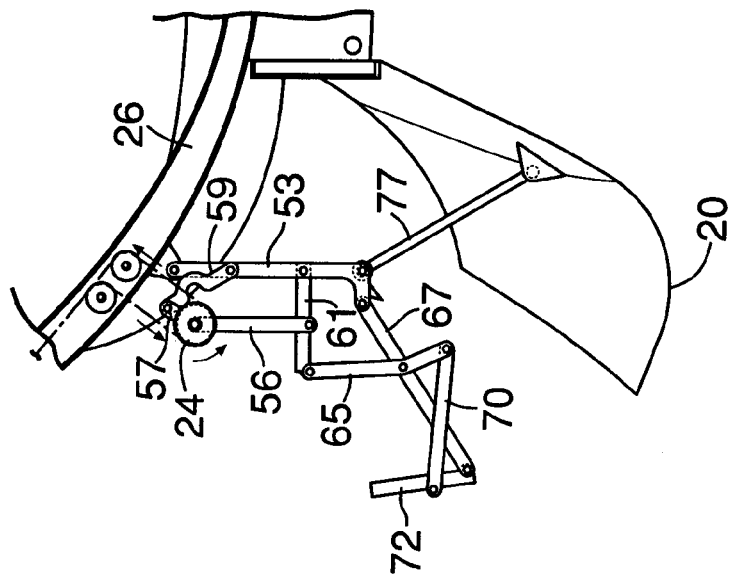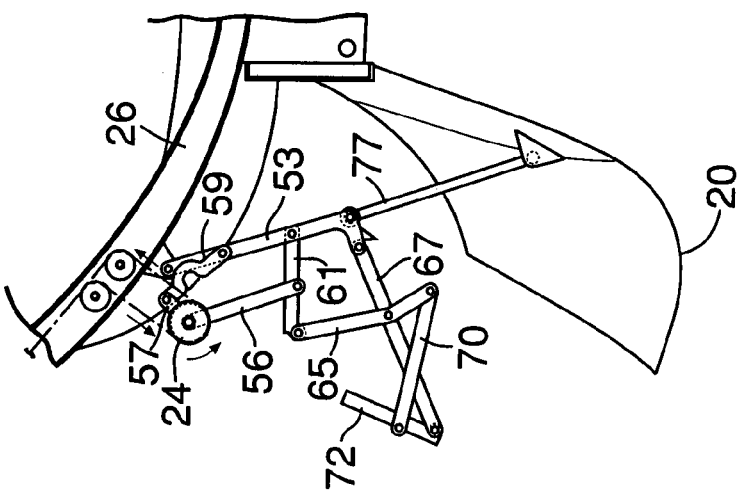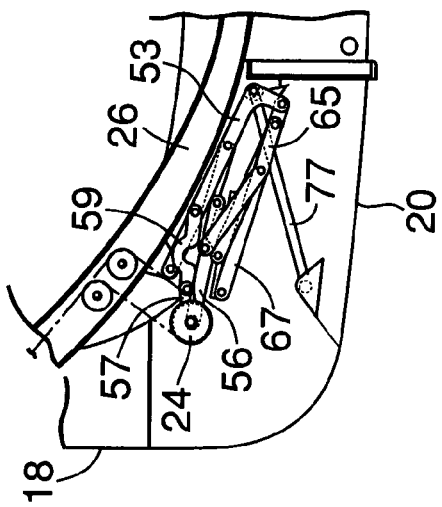

BOARDING RAMP DEVICE FOR AIRCRAFT

CROSS-REFERENCE TO RELATED APPLICATIONS

The present application claims priority under 35 USC 119 to Japanese Patent Application No. 2006-103268 filed on Apr. 4, 2006 the entire contents of which are hereby incorporated by reference.

BACKGROUND OF THE INVENTION

1. Field of the Invention

The present invention relates to a boarding ramp device for an aircraft that includes a body, a main wing, and a fairing for covering a connecting portion between the body and the main wing. The fairing bulges in a lower face of the body.

2. Description of the Related Art

U.S. Pat. No. 4,014,486 and Japanese Patent Application Laid-open No. 4-230495 disclose a device in which a boarding ramp that is stored in a folded state in a body is deployed from a door opening formed in the body to the ground. The boarding ramp is stored in a folded state in view of the fact that there is a distance between the door opening and the ground. Thus, it is difficult for passengers to directly get on and off the aircraft without the use of a boarding ramp.

In addition, U.S. Pat. No. 4,453,684 discloses a device in which a door for opening and closing a door opening formed in a body is divided into a door upper-part and a door lower-part. A boarding ramp is provided on an inner surface of the door lower-part.

Further, U.S. Pat. No. 4,440,364 discloses a device that includes a boarding ramp that is extendable from a stored position along a lower face of a body to a use position wherein the boarding ramp projects sideward of the body. A dedicated fairing is provided in the body so as to cover the boarding ramp in the stored state.

However, U.S. Pat. No. 4,014,486 and Japanese Patent Application Laid-open No. 4-230495 have a problem wherein the space for a passenger compartment or a cargo compartment of the aircraft is decreased by the boarding ramp because the boarding ramp in the folded state is stored inside the aircraft.

Also, the boarding ramp described in U.S. Pat. No. 4,453,684 has a problem that the device is applicable only to a small-sized aircraft wherein distance between the lower end of the door opening and the ground is about the length of the door lower-part because the boarding ramp is provided on the inner face of the door lower-part.

Further, the boarding ramp described in U.S. Pat. No. 4,440,364 has a problem in that the dedicated fairing for covering the boarding ramp in the stored position is required to be provided on the lower face of the body, which increases air resistance.

SUMMARY OF THE INVENTION

The present invention has been achieved in view of the above circumstances. It is an object of an embodiment of the present invention to accommodate a foldable boarding ramp of an aircraft without reducing the space inside a body or increasing air resistance.

In order to achieve the above object, according to an embodiment of the present invention, there is provided a boarding ramp device for an aircraft that includes a body, a door opening provided in the body, a door for opening and closing the door opening, a main wing, and a fairing for covering a connecting portion between the body and the main wing. The fairing bulges in a lower face of the body, wherein the boarding ramp device comprises a foldable boarding ramp which connects the door opening to the ground, and which is stored inside the fairing in a folded state.

With this arrangement, the foldable boarding ramp connecting the door opening provided in the body to the ground is stored in the folded state inside the fairing covering the connecting portion between the body and the main wing. Thus, it is possible to prevent a reduction in the space of a passenger compartment and a cargo compartment due to the folded boarding ramp. Also, an increase in air resistance can be suppressed without providing a dedicated fairing for covering the boarding ramp.

According to an embodiment of the present invention, interlocking means connects the door and the boarding ramp so that the boarding ramp is deployed in association with the opening of the door.

With this arrangement, the door which opens and closes the door opening and the boarding ramp are connected together by the interlocking means so that the boarding ramp is automatically deployed when the door is opened, thereby improving convenience.

According to an embodiment of the present invention, the interlocking means comprises a clutch mechanism for releasing interlocking between the door and the boarding ramp.

With this arrangement, since a clutch mechanism for releasing interlocking between the door and the boarding ramp is provided in the interlocking means, even if the boarding ramp is locked in the folded state and can not be deployed, the door can be opened by releasing the interlocking between the door and the boarding ramp using the clutch mechanism, thereby enabling ingress and egress of passengers.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 11 is a view for explaining the operation when a boarding ramp is deployed.

DETAILED DESCRIPTION OF THE PREFERRED EMBODIMENTS

Figure 1A:
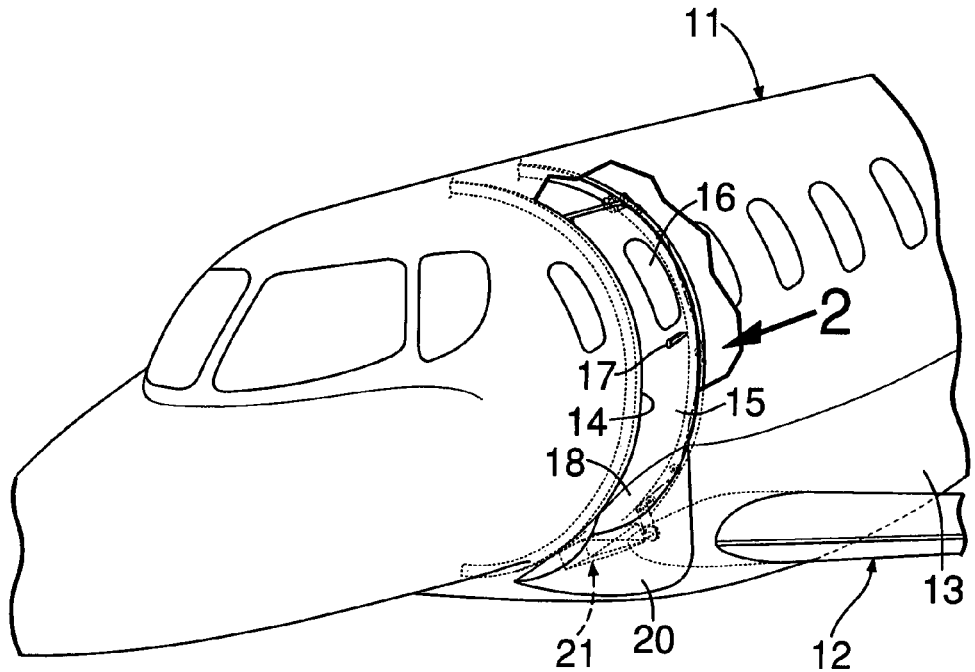
FIG. 1 is a perspective view of a body front portion of an aircraft.
Figure 1B:
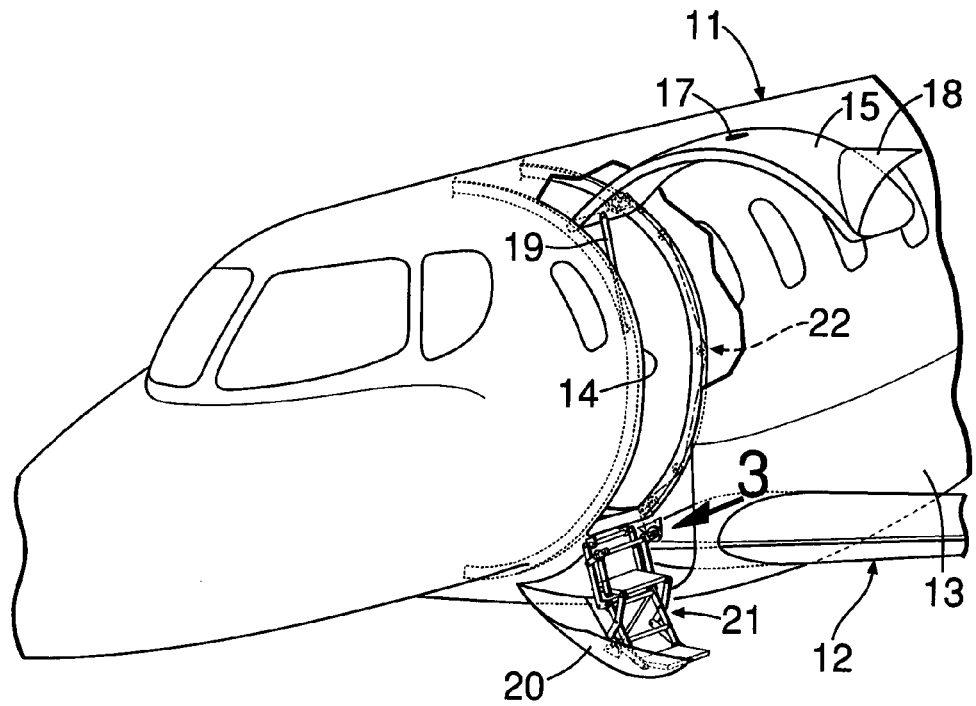

As shown in FIG. 1, a connecting portion between a lower part of a body 11 and a main wing 12 of an aircraft is shaped by a fairing 13. The fairing 13 bulges outwardly from the surface of the body 11 and continues to the surface of the main wing 12 so as to suppress an increase in drag caused by interference between air flowing around the body 11 and air flowing around the main wing 12. A door 15 opens and closes a door opening 14 formed in a side face of the body 11 forward of a front edge of the main wing 12. The door 15 can be opened outwardly of the body 11 with an unillustrated hinge provided as a fulcrum at an upper end of the door 15. The manually opened and closed door 15 is provided with a window 16, a handle 17 for opening the door 15 from outside the aircraft, a shaping portion 18 constituting a part of the fairing 13, and a damper 19 for reducing a force required for opening and closing. Provided below the door opening 14 is a cover 20 constituting a part of the fairing 13 and capable of being opened and closed. A boarding ramp 21 is stored inside the cover 20 in a folded state. When the door 15 is opened, the cover 20 is opened downwardly in association with the opening, and the boarding ramp 21 is automatically deployed toward the ground.

Figure 2:
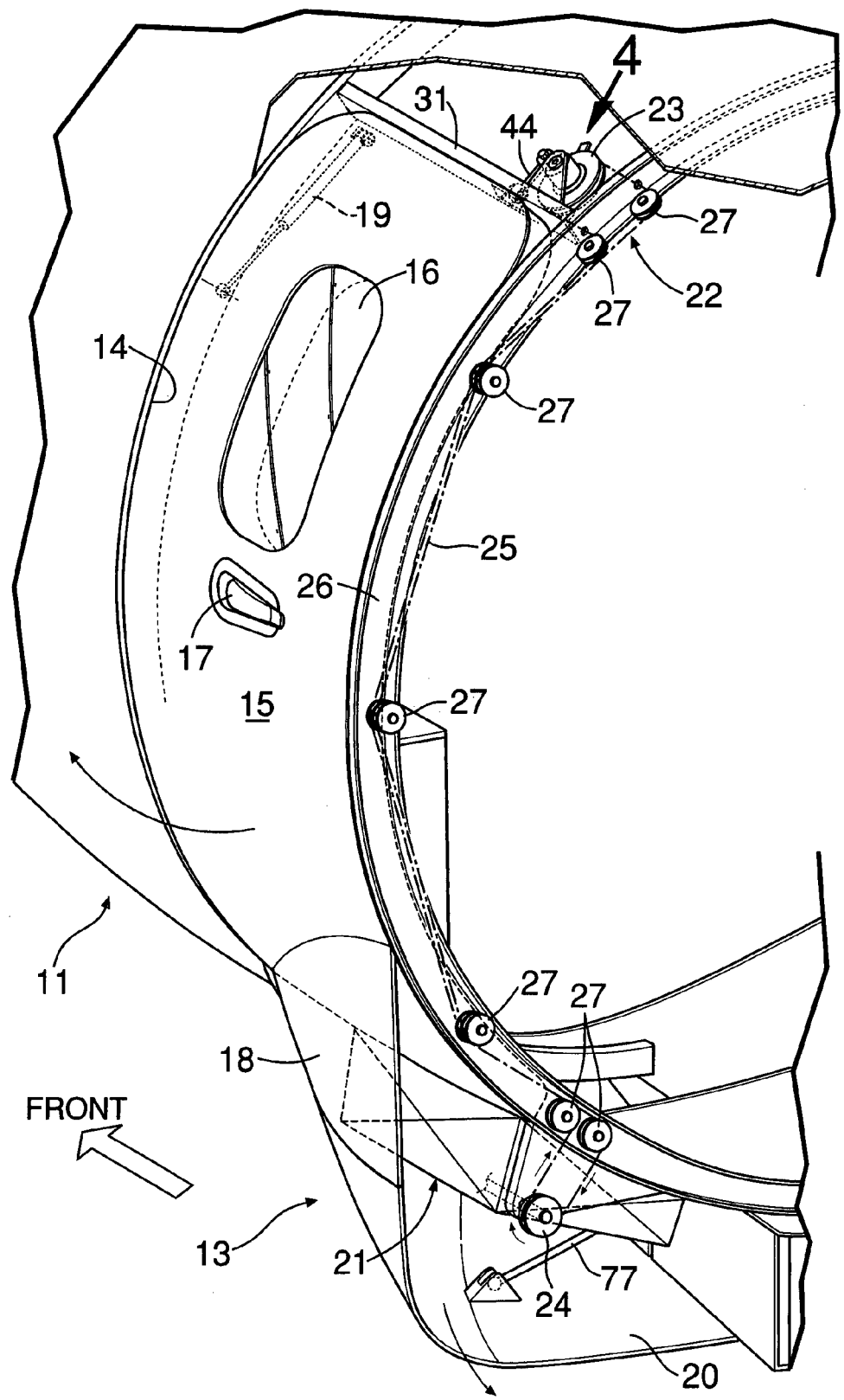
FIG. 2 is an enlarged view taken from Arrow 2 in FIG. 1.

As shown in FIG. 2, the door 15 is connected to the boarding ramp 21 through interlocking means 22. The interlocking means 22 includes a driving pulley 23 provided at an upper part of the door opening 14, and a driven pulley 24 provided in the boarding ramp 21 and connected through a cable 25 to the driving pulley 23. An intermediate portion of the cable 25 is guided by a plurality of intermediate pulleys 27 provided in an annular body frame 26 along the rear edge of the door opening 14.

As illustrated in FIGS. 2 and 4 to 8, a structure with regard to the driving pulley 23 will be described.

A pipe-shaped support shaft 33 is fixed in an axis L direction to a bracket 32 provided in a longitudinal member 31 extending in the forward/rearward direction along the upper edge of the door opening 14. The driving pulley 23 and a clutch ring 34 are rotatably supported on the outer circumference of the support shaft 33 and independently from each other. A cylinder portion 35a of a driven arm 35 is fitted through a key groove 35b and a key 36 in the outer circumference of the clutch ring 34. The clutch ring 34 is connected to the cylinder portion 35a of the rotating arm 35 that is not capable of relative rotation but is capable of sliding in the direction of the axis L. Three recess portions 34c formed at the lower end of the clutch ring 34 are opposed to three projections 23a formed on the upper face of the driving pulley 23 so that they are engaged with each other.

A clutch shaft 37 is slidably fitted inside the pipe-shaped support shaft 33 in the axis L direction and is biased downwardly by a spring 39 provided under compression between the clutch shaft 37 and an end plate 38 fixed to the upper end of the support shaft 33. A pin 40 implanted in the clutch shaft 37 slidably penetrates a long hole 33a formed in the support shaft 33 in the direction of the axis L and is fitted in an annular guide hole 34a formed in the clutch ring 34. A pin hole 34b penetrates the clutch ring 34 in the radially outward direction from the guide hole 34a in order to assemble the pin 40. A lever 41 is fitted in a slit 33b formed at the lower end of the support shaft 33, and is pivotally supported by a pin 42 so as to be capable of oscillation. A contact portion 41a at the base end of the lever 41 contacts the lower end of a clutch shaft 37. The clutch ring 34, the clutch shaft 37, the spring 39 and the lever 41 constitute a clutch mechanism 47.

A driving arm 43 is provided in an upper part of the door 15 so as to loosely penetrate the opening 31a of the longitudinal member 31 and extends into the bracket 32. The tip end of the driving arm 43 and the tip end of the driven arm 35 are connected to opposite ends of a connecting rod 44 through ball joints 45 and 46.

Figure 3:
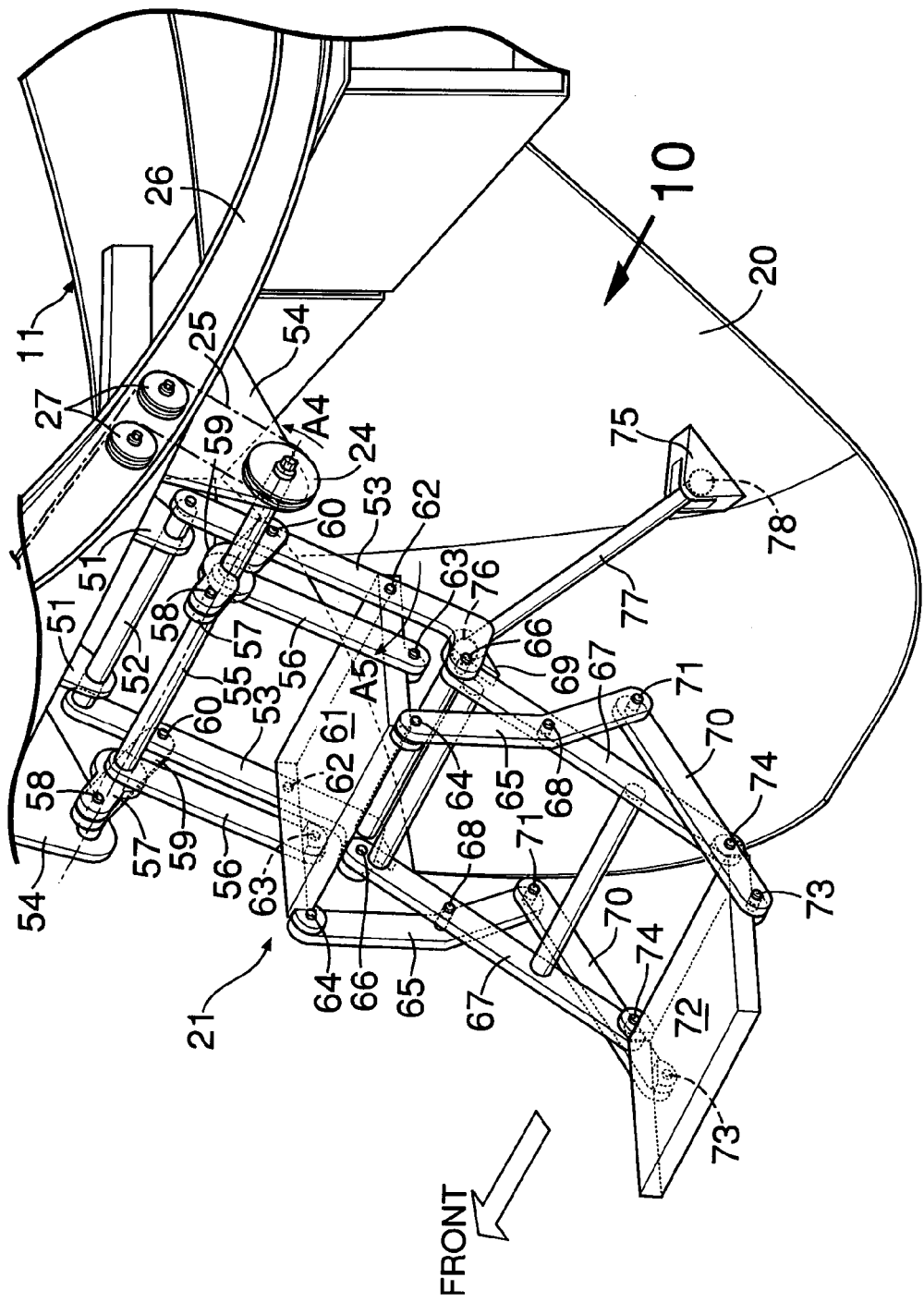
FIG. 3 is an enlarged view taken from Arrow 3 in FIG. 1.
Figure 4:
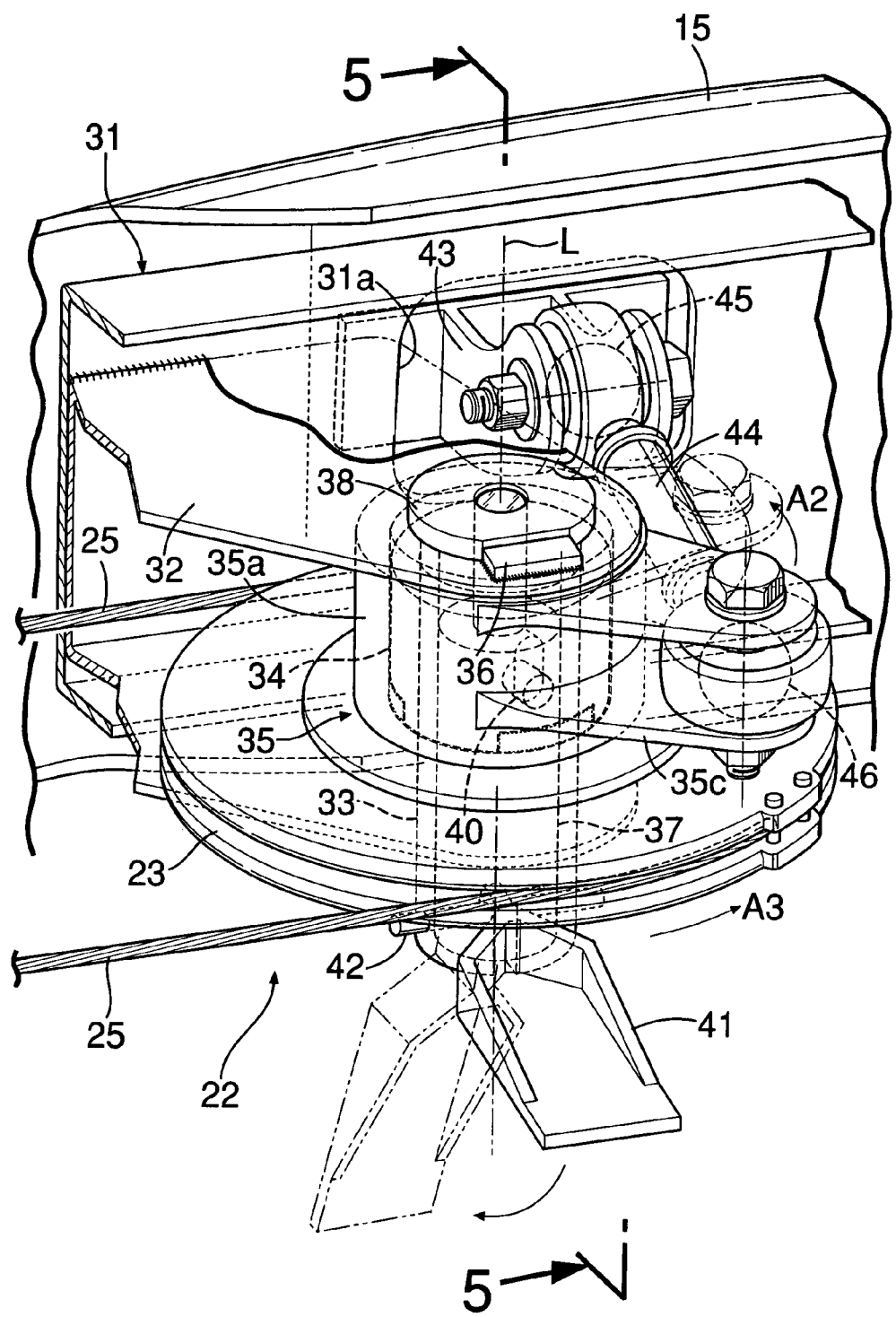
FIG. 4 is an enlarged view taken from Arrow 4 in FIG. 2.
Figure 10:
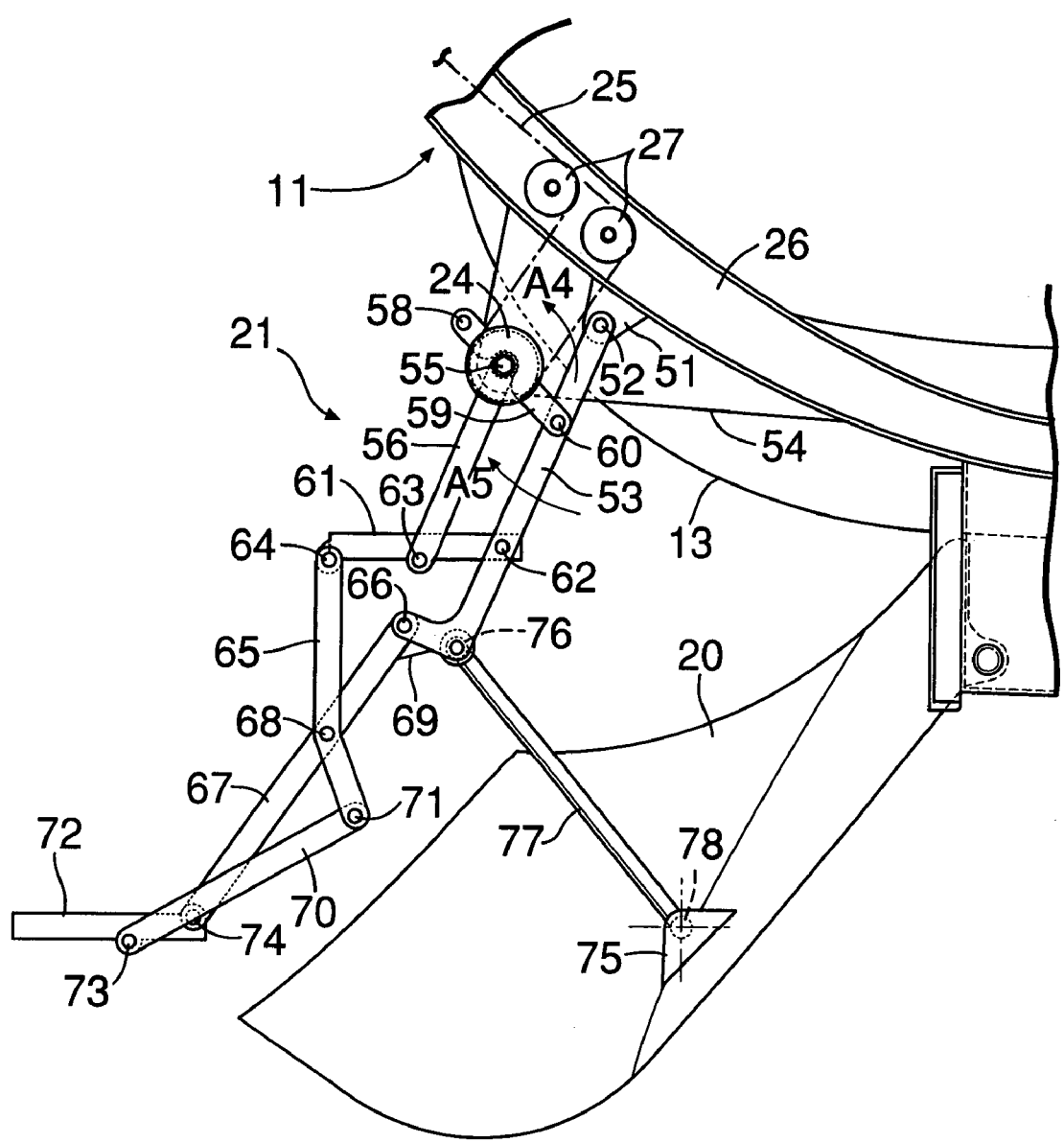
FIG. 10 is a view taken from Arrow 10 in FIG. 3.

As illustrated in FIGS. 3 and 10, the structure of the boarding ramp 21 will be described.

Base ends of a pair of swing arms 53 are fixed to opposite ends of a support shaft 52 rotatably supported by a pair of brackets 51 provided on the body 11. Base ends of the support links 56 are fixed to opposite ends of a rotating shaft 55 rotatably supported by brackets 54 provided on the body 11. Fixed to the rotating shaft 55 are the driven pulley 24 and the base ends of a pair of crank links 57. The tip ends of the crank links 57 and intermediate portions of the swing arms 53 are connected to each other through pins 58, drive links 59 and pins 60. Base ends of an upper step 61 are connected through pins 62 to the intermediate portions of the swing arms 53. The tip ends of the support links 56 are connected to the intermediate portions of the upper step 61 through pins 63.

An intermediate portion of each connecting link 65 having a base end pivotally supported through a pin 64 at the tip end of the upper step 61 and an intermediate portion of each extend link 67 having a base end pivotally supported through a pin 66 at the tip end of the swing arm 53 are pivotally supported through a pin 68. Stoppers 69 are provided at the tip ends of the swing arms 53 so as to define rotational limit positions of the extend links 67. Base ends of support links 70 are pivotally supported through pins 71 at the tip ends of the connecting links 65. Intermediate portions of a lower step 72 are pivotally supported through pins 73 at the tip ends of the support links 70. The base ends of the lower step 72 are pivotally supported through pins 74 at the tip ends of the extend links 67.

The tip end of the swing arm 53 and a bracket 75 provided on the inner face of the cover 20 are linked to each other through a ball joint 76, a cover opening/closing rod 77 and a ball joint 78.

The following is a description of the operation of the embodiment provided with the above construction.

Figure 5:
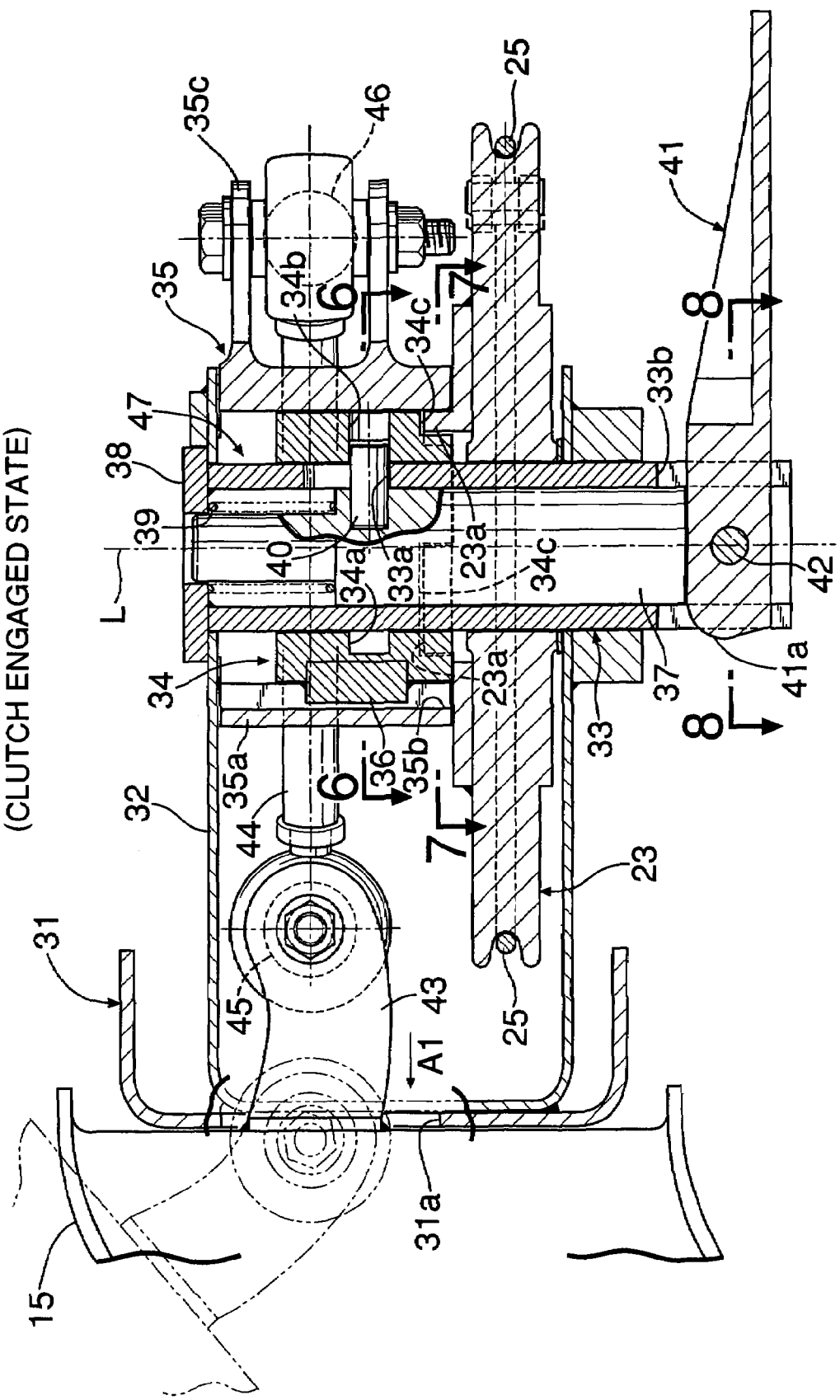
FIG. 5 is a sectional view taken along a line 5-5 in FIG. 4 (clutch engaged state)
Figure 6:
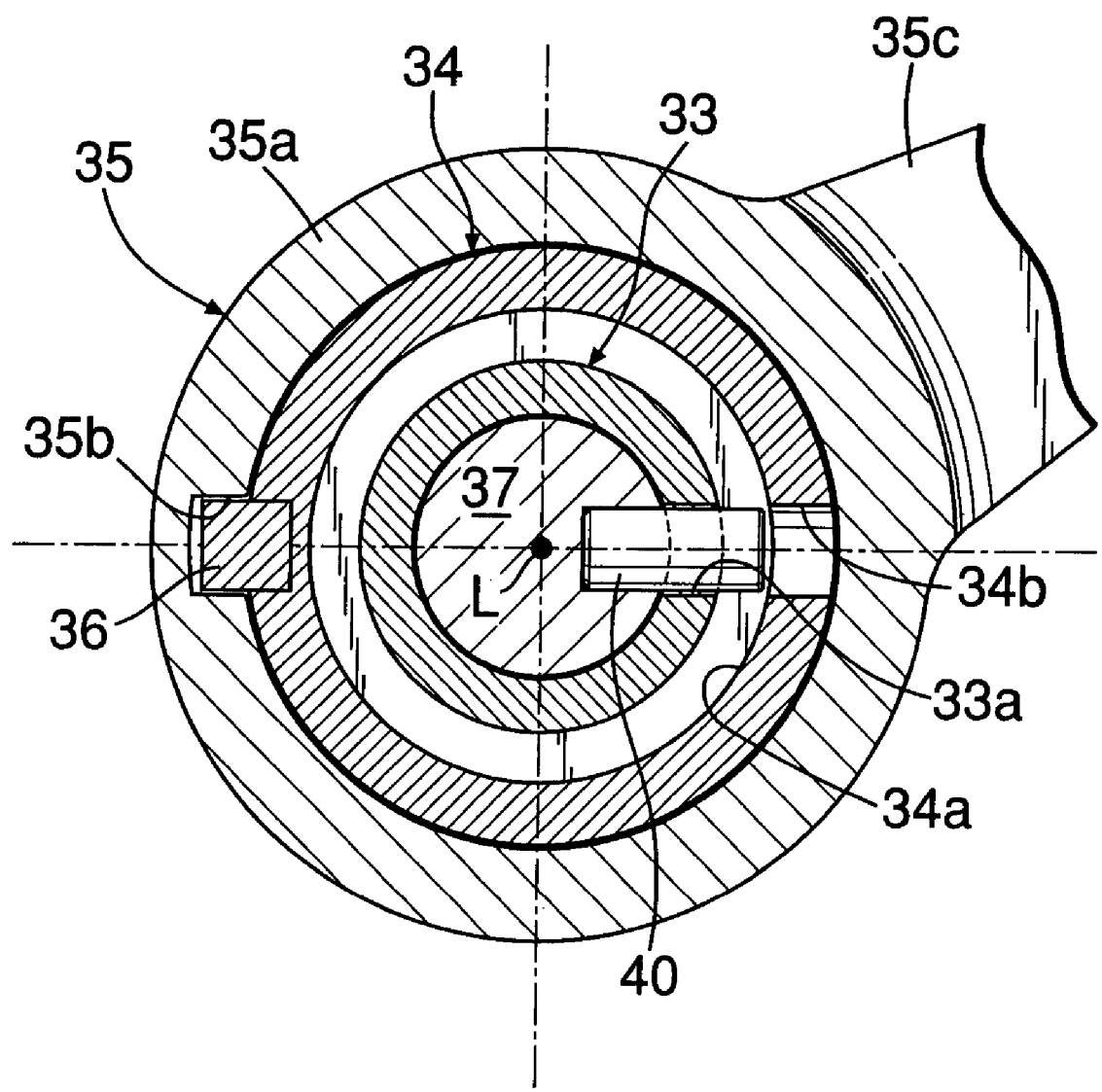
FIG. 6 is a sectional view taken along a line 6-6 in FIG. 5.
Figure 7:
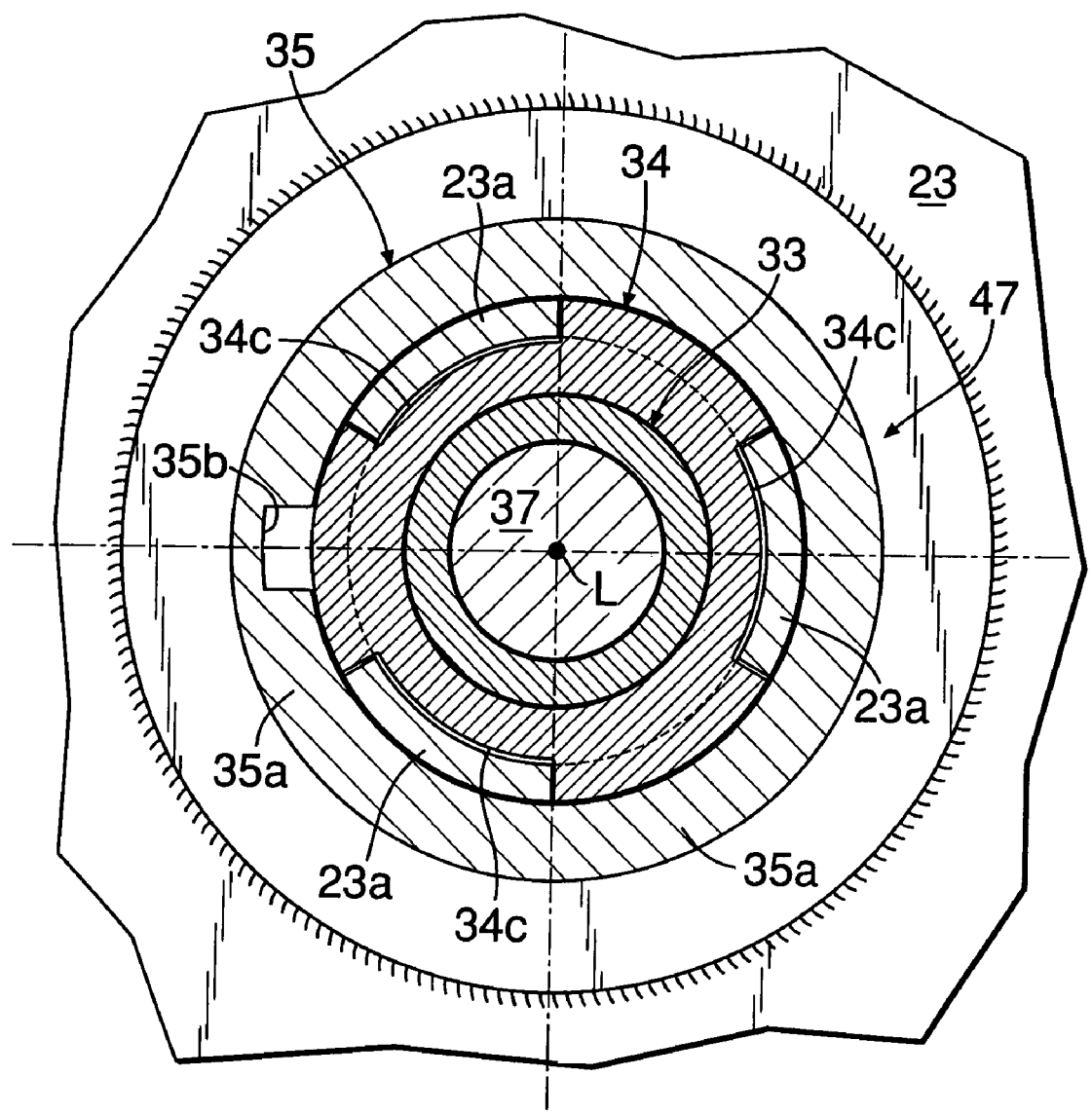
FIG. 7 is a sectional view taken along a line 7-7 in FIG. 5.
Figure 8:
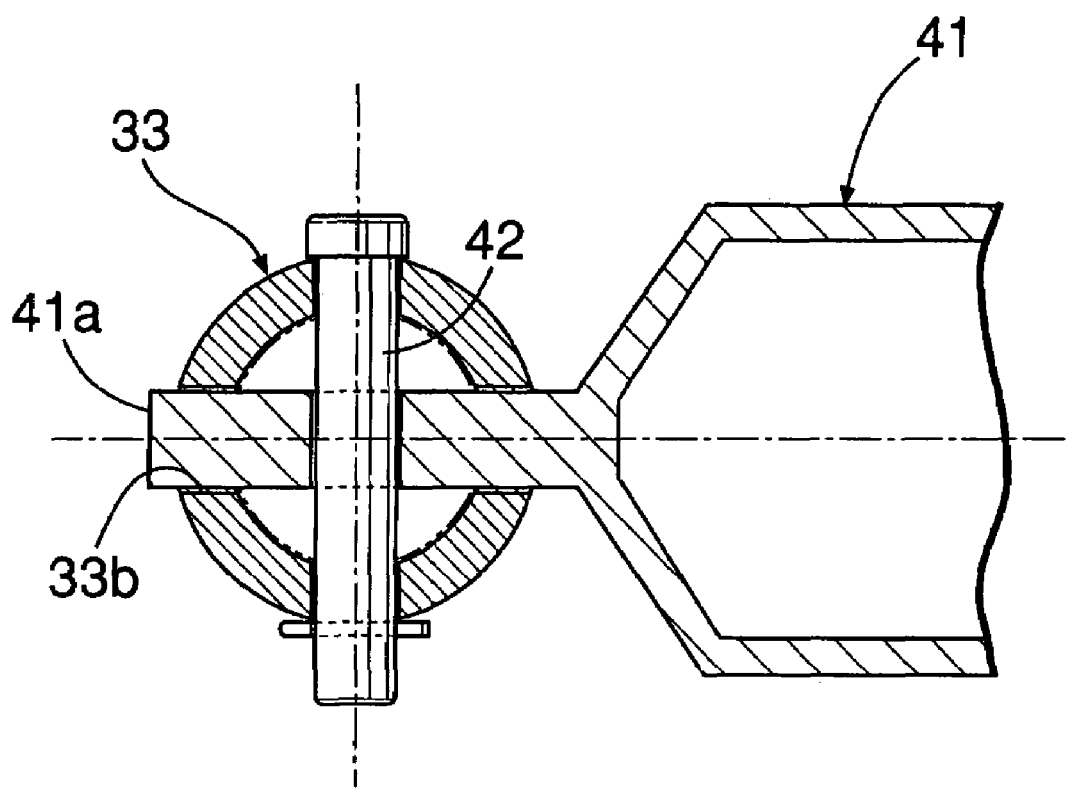
FIG. 8 is a sectional view taken along a line 8-8 in FIG. 5.

In normal operation, the clutch mechanism 47 of the interlocking means 22 is in an engagement state shown in FIG. 5 where projections 23a of the driving pulley 23 are engaged with recess portions 34c of the clutch ring 34. When the door 15 is manually opened in this state, the driving arm 43 provided in the door 15 is moved in the direction of Arrow A1 in FIG. 5, and the arm portion 35c of the driven arm 35 is moved in the direction of Arrow A2 in FIG. 4 through the connecting rod 44. As a result, in FIG. 5, the clutch ring 34 is rotated around the support shaft 33 through the key 36 and the key groove 35b formed on the inner circumferential face of the cylinder portion 35a of the driven arm 35. In addition, the driving pulley 23, having the projections 23a engaged with the recess portions 34c of the clutch ring 34, is rotated around the support shaft 33 (see Arrow A3 in FIG. 4). When the clutch ring 34 is rotated around the support shaft 33, the rotation of the clutch ring 34 is not inhibited because the pin 40 slides along the annular guide hole 34a of the clutch ring 34.

When the driving pulley 23 of the interlocking means 22 is rotated in this way, the driven pulley 24 is rotated in the direction of Arrow A4 in FIGS. 3 and 10 through the cable 25 guided by the intermediate pulleys 27. As a result, the crank links 57 are rotated through the rotating shaft 55 integral with the driven pulley 24, and the swing arms 53 are rotated around the support shaft 52 in the direction of Arrow A5 through the drive links 59 connected to the crank links 57. In association with this rotation of the swing arms 53, the support links 56, the connecting links 65, the extend links 67 and the support links 70 are deployed as sequentially shown in FIG. 11A, FIG. 11B, FIG. 11C and FIG. 10.

FIGS. 3 and 10 show a state where the boarding ramp 21 is fully deployed. In this state, the upper step 61 and the lower step 72 are horizontal so as to enable ingress and egress of passengers. With deployment of the boarding ramp 21, the cover 20 constituting a part of the fairing 13 is opened downwardly through the cover opening/closing rod 77. When the door 15 is closed, the driving pulley 23 and the driven pulley 24 are rotated in the direction reverse to the above-described direction, whereby the boarding ramp 21 in the deployed state is stored and the cover 20 is closed.

Since the boarding ramp 21 can be automatically deployed and stored as described above with the opening and closing of the door 15, the convenience can be improved as compared with the case where they are separately carried out.

If the boarding ramp 21 is locked in the stored state for some reason, there is a possibility that the door 15 can not be opened or closed because the door 15 and the boarding ramp 21 are connected together by the interlocking mechanism 22. In this case, the clutch mechanism 47 provided in the driving pulley 23 is disengaged so that the driving pulley 23 is capable of idle rotation to release the interlocking between the door 15 and the boarding ramp 21, whereby only the door 15 can be opened and closed.

Figure 9:
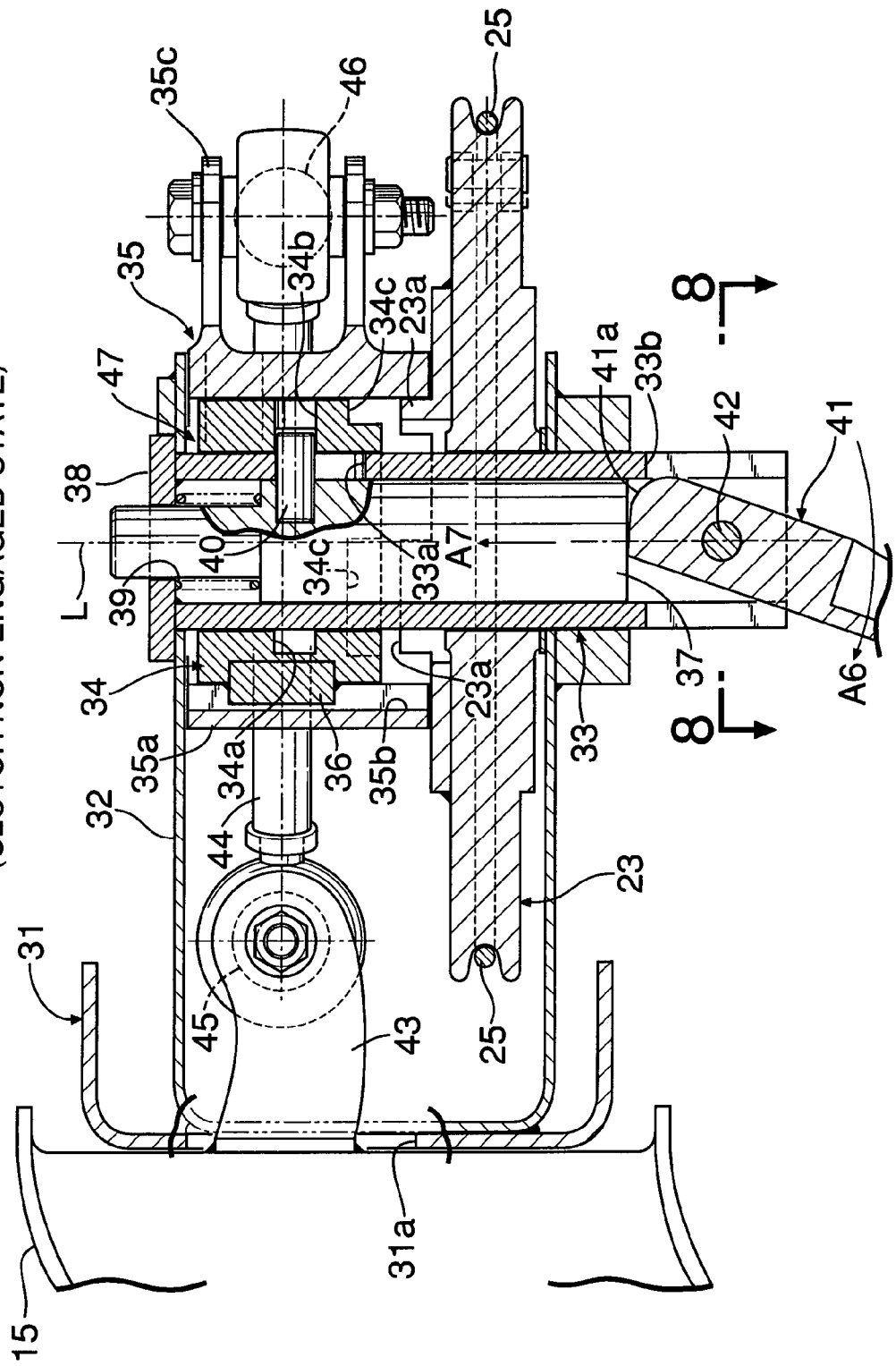
FIG. 9 is a view for explaining the operation corresponding to FIG. 5 (clutch non-engaged state)

More specifically, as shown in FIG. 9, when the lever 41 is operated in the direction of Arrow A6, a contact portion 41a of the lever 41 moves the clutch shaft 37 in the direction of Arrow A7 against an elastic force of the spring 39. This movement of the clutch shaft 37 slides the pin 40 in the long hole 33a of the support shaft 33, and the clutch ring 34 engaged with the pin 40 is moved while the key 36 is guided by the key groove 35b of the driven arm 35. As a result, the engagement between the recess portions 34c of the clutch ring 34 and the projections 23a of the driving pulley 23 is released, whereby the clutch mechanism 47 is brought into a non-engaged state.

In this state, even if the driving pulley 23, connected to the fixed boarding ramp 21 through the cable 25 becomes unrotatable, the door 15 can be opened and closed without any problem, because the clutch ring 34 which is operative in association with the opening and closing of the door 15 through the driving arm 43, the connecting rod 44, the driven arm 34 and the key 36 is separated from the driving pulley 23, thereby avoiding a situation where the passengers cannot get on or off the aircraft.

Therefore, since the foldable boarding ramp 21 connecting the door opening 14 of the body 11 and the ground is stored in the folded state inside the fairing 13 covering the connecting portion between the body 11 and the main wing 12, the folded boarding ramp 21 does not reduce the space for the passenger compartment or the cargo compartment in the body 11. Moreover, a dedicated fairing for covering the folded boarding ramp 21 is not needed, thereby suppressing an increase in air resistance.

The embodiment of the present invention has been described above, but various changes in design can be made to the present invention without departing from the subject matter thereof.

For example, in the embodiment, the boarding ramp 21 is arranged on the front edge side of the main wing 12, but it may be arranged on the rear edge side of the main wing 12.

Also, in the embodiment, the door 15 is manually opened and closed, but it may be opened and closed by an actuator.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A boarding ramp device for an aircraft, the aircraft comprising:
   a body;
   a door opening provided in the body;
   a door for opening and closing the door opening;
   a main wing; and
   a fairing for covering a connecting portion between the body and the main wing, the fairing bulging in a lower face of the body;
   wherein the boarding ramp device comprises a foldable boarding ramp which connects the door opening to the ground, and which is stored inside the fairing in a folded state, and further comprising
   interlocking means for connecting together the door and the boarding ramp so that the foldable boarding ramp is deployed in association with opening of the door, and
   wherein the interlocking means comprises a clutch mechanism provided at an upper portion of the door opening for releasing interlocking between the door and the foldable boarding ramp,
   wherein said interlocking means further includes a driving pulley provided at the upper portion of the door opening, a driven pulley operatively connected to said boarding ramp and a cable being operatively connected to said driven pulley and said driving pulley for deploying said foldable boarding ramp as said door is opened,
   wherein said driving pulley includes a support shaft operatively mounted to a bracket, the driving pulley and a clutch ring are rotatably supported on an outer circumference of the support shaft independently from each other, a portion of a driven arm is mounted through a key groove and a key in the outer circumference of the clutch ring with the clutch ring being non-rotatably mounted relative to said support shaft, said clutch ring being slidably mounted relative to said support shaft with recess portions being formed on said clutch ring that mate with projections formed on an upper surface of the driving pulley, and
   further including a clutch shaft slidably fitted within the support shaft and being biased downwardly by a biasing member under compression and being disposed between a clutch shaft and an end plate mounted to an upper end of the support shaft, a pin secured to said clutch shaft is disposed within an aperture in the clutch ring, a lever is fitted in a slit formed in a lower end of the support shaft, said lever being pivotally supported by a pin for oscillation, a contact portion formed at a base end of the lever being in contact with the lower end of the clutch shaft, said clutch ring, said clutch shaft, said biasing member and said lever forming the clutch mechanism at the upper portion of the door opening.

2. A boarding ramp device adapted to be used with an aircraft comprising:
   body;
   a door opening provided in the body;
   a door for opening and closing the door opening;
   a fairing bulging in a lower face of the body; and
   a foldable boarding ramp operatively connected to the door opening for permitting ingress and egress to the body, said foldable boarding ramp being stored inside the fairing in a folded state, and further comprising interlocking means for connecting together the door and the boarding ramp so that the foldable boarding ramp is deployed in association with opening of the door, and wherein the interlocking means comprises a clutch mechanism provided at an upper portion of the door opening for releasing interlocking between the door and the foldable boarding ramp, wherein said interlocking means further includes a driving pulley provided at the upper portion of the door opening, a driven pulley operatively connected to said boarding ramp and a cable being operatively connected to said driven pulley and said driving pulley for deploying said foldable boarding ramp as said door is opened, wherein said driving pulley includes a support shaft operatively mounted to a bracket, the driving pulley and a clutch ring are rotatably supported on an outer circumference of the support shaft independently from each other, a portion of a driven arm is mounted through a key groove and a key in the outer circumference of the clutch ring with the clutch ring being non-rotatably mounted relative to said support shaft, said clutch ring being slidably mounted relative to said support shaft with recess portions being formed on said clutch ring that mate with projections formed on an upper surface of the driving pulley, and further including a clutch shaft slidably fitted within the support shaft and being biased downwardly by a biasing member under compression and being disposed between a clutch shaft and an end plate mounted to an upper end of the support shaft, a pin secured to said clutch shaft is disposed within an aperture in the clutch ring, a lever is fitted in a slit formed in a lower end of the support shaft, said lever being pivotally supported by a pin for oscillation, a contact portion formed at a base end of the lever being in contact with the lower end of the clutch shaft, said clutch ring, said clutch shaft, said biasing member and said lever forming the clutch mechanism at the upper portion of the door opening.

3. A boarding ramp device for an aircraft, the aircraft comprising:

a body having an annular body frame;

a door opening provided in the body;

a door for opening and closing the door opening;

a main wing; and a fairing for covering a connecting portion between the body and the main wing, the fairing bulging in a lower face of the body;

wherein the boarding ramp device comprises a foldable boarding ramp which connects the door opening to the ground, and which is stored in a folded state inside a space between an outer surface of the annular body frame and a part of the fairing facing the outer surface of the annular body frame.

4. The boarding ramp device for an aircraft according to claim 3, wherein said part of the fairing forms a cover for the boarding ramp, said cover being made open in association with the opening of the door via an interlocking device.

5. The boarding ramp device for an aircraft according to claim 4, wherein said boarding ramp is supported rotatably on the outer surface of the body frame via a support shaft.

* * * * *